United States Patent
Sim

(10) Patent No.: US 11,260,864 B2
(45) Date of Patent: Mar. 1, 2022

(54) PATH GENERATION APPARATUS AT INTERSECTION, AND METHOD AND APPARATUS FOR CONTROLLING VEHICLE AT INTERSECTION

(71) Applicant: MANDO CORPORATION, Pyeongtaek-si (KR)

(72) Inventor: Sangkyun Sim, Anyang-si (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 255 days.

(21) Appl. No.: 16/595,813

(22) Filed: Oct. 8, 2019

(65) Prior Publication Data
US 2020/0108833 A1  Apr. 9, 2020

(30) Foreign Application Priority Data
Oct. 8, 2018 (KR) .......................... 10-2018-0120040

(51) Int. Cl.
*B60W 40/072* (2012.01)
*G05D 1/02* (2020.01)
(Continued)

(52) U.S. Cl.
CPC .... *B60W 30/18154* (2013.01); *B60W 40/072* (2013.01); *G05D 1/0088* (2013.01);
(Continued)

(58) Field of Classification Search
CPC ......... B60W 30/18154; B60W 40/072; B60W 2520/06; B60W 30/18159; B60W 40/06;
(Continued)

(56) References Cited

U.S. PATENT DOCUMENTS 9,802,529 B2 * 10/2017 Herntrich ............... B60Q 1/085
10,723,345 B2 * 7/2020 Glander ................ B60W 50/14
(Continued)

FOREIGN PATENT DOCUMENTS

JP  2013-88409 A  5/2013
JP  2013-088409 A  5/2013
(Continued)

OTHER PUBLICATIONS

D. Zhou, Z. Ma and J. Sun, "Autonomous Vehicles' Turning Motion Planning for Conflict Areas at Mixed-Flow Intersections," in IEEE Transactions on Intelligent Vehicles, vol. 5, No. 2, pp. 204-216, Jun. 2020, doi: 10.1109/TIV.2019.2955854. (Year 2020).*
(Continued)

*Primary Examiner* — Cuong H Nguyen
(74) *Attorney, Agent, or Firm* — Morgan, Lewis & Bockius LLP

(57) ABSTRACT

Provided is a vehicle path generating apparatus at an intersection and an apparatus and method for controlling a vehicle at an intersection that are capable of providing safe autonomous driving at an intersection by calculating the accurate position of an intersection point, which is a cut position of a lane or a crossing position of lanes, in an intersection area using map information and/or image information, precisely calculating a vehicle movement path in the intersection on the basis of the calculated position of the intersection point, and automatically controlling a travel of the vehicle according to the calculated vehicle travel path.

16 Claims, 8 Drawing Sheets

(51) Int. Cl.
*G08G 1/0967* (2006.01)
*B60W 30/18* (2012.01)
*G05D 1/00* (2006.01)

(52) U.S. Cl.
CPC ......... *G05D 1/0246* (2013.01); *G05D 1/0274* (2013.01); *B60W 2520/06* (2013.01); *G05D 2201/0213* (2013.01)

(58) Field of Classification Search
CPC .. G05D 1/0088; G05D 1/0246; G05D 1/0274; G05D 2201/0213; G05D 1/02; G05D 1/021; G08G 1/09623; G08G 1/0967; G01C 21/3626; G01C 21/3635
See application file for complete search history.

(56) References Cited

U.S. PATENT DOCUMENTS

| | | | | |
|---|---|---|---|---|
| 10,829,121 | B1* | 11/2020 | Allan | B60W 30/18163 |
| 2014/0118552 | A1* | 5/2014 | Takahama | G08G 1/167 348/148 |
| 2018/0208183 | A1* | 7/2018 | Glander | B60W 50/14 |
| 2018/0349715 | A1* | 12/2018 | Gupta | G08G 1/20 |
| 2021/0216794 | A1* | 7/2021 | Gupta | G01C 21/32 |
| 2021/0216795 | A1* | 7/2021 | Gupta | G01C 21/32 |

FOREIGN PATENT DOCUMENTS

| | | | | |
|---|---|---|---|---|
| JP | 2016-75905 | A | 5/2016 | |
| KR | 10-0815153 | B1 | 3/2008 | |
| KR | 10-1392850 | B1 | 5/2014 | |
| KR | 10-1704405 | B1 | 2/2017 | |
| KR | 101704405 | B1 * | 2/2017 | |
| KR | 10-2018-0040760 | A | 4/2018 | |
| WO | WO-2018126228 | A1 * | 7/2018 | ............ G06T 17/00 |

OTHER PUBLICATIONS

P. Cai, Y. Sun, Y. Chen and M. Liu, "Vision-Based Trajectory Planning via Imitation Learning for Autonomous Vehicles," 2019 IEEE Intelligent Transportation Systems Conference (ITSC), 2019, pp. 2736-2742, doi: 10.1109/ITSC.2019.8917149. (Year: 2019).*
K. Shu et al., "Autonomous Driving at Intersections: A Critical-Turning-Point Approach for Left Turns," 2020 IEEE 23rd International Conference on Intelligent Transportation Systems (ITSC), 2020, pp. 1-6, doi: 10.1109/ITSC45102.2020.9294754. (Year: 2020).*
M. Zhang, R. Fu, D. D. Morris and C. Wang, "A Framework for Turning Behavior Classification at Intersections Using 3D LIDAR," in IEEE Transactions on Vehicular Technology, vol. 68, No. 8, pp. 7431-7442, Aug. 2019, doi: 10.1109/TVT.2019.2926787. (Year: 2019).*
Office Action issued in Korean Patent Application No. 10-2018-0120040 dated Sep. 30, 2019.
Korean Office Action dated Sep. 30, 2019 issued in Korean Patent Application No. 10-2018-0120040.

* cited by examiner

PATH GENERATION APPARATUS AT INTERSECTION, AND METHOD AND APPARATUS FOR CONTROLLING VEHICLE AT INTERSECTION

CROSS-REFERENCE TO RELATED APPLICATION

This application is based on and claims priority under 35 U.S.C. § 119 to Korean Patent Application No. 2018-0120040, filed on Oct. 8, 2018 in the Korean Intellectual Property Office, the disclosure of which is incorporated herein by reference.

BACKGROUND

1. Field

The present invention relates to a vehicle path generation apparatus at an intersection and an apparatus and method for controlling a vehicle at an intersection, and more specifically, to a technology for calculating the position of an intersection point in an intersection and generating a vehicle movement path so that a vehicle movement at the intersection is automatically controlled through the vehicle movement path.

2. Description of the Related Art

Recently, due to improvement of vehicle control technologies, various driver assistance systems (DAS) have been developed, and among the DAS systems, a function has been developed to control the steering angle or braking force of a vehicle regardless of a driver's intention to secure the vehicle stability or increase the convenience.

The steering related DAS system may include a lane keeping assistance system (LKAS) for assisting the vehicle to maintain the travel lane, a lane change assistance system (LCAS) for preventing a collision with another vehicles when changing lanes and warning the vehicle, and the like.

In addition, the braking related DAS system may include an autonomous emergency braking (AEB) system that automatically brakes a vehicle without a driver's intervention when a forward or rearward collision of the vehicle is predicted.

In addition, a cross traffic alter or assist (CTA) system that recognizes an intersection when a vehicle enters an intersection area and warns the vehicle has been developed.

Meanwhile, with recent development of autonomous vehicles, there has been a need for a function of automatically operating a vehicle along a predetermined path while minimizing the driver's involvement, which in turn drives a need to integrate or upgrade the existing functions of the DAS system.

As for the autonomous driving that allows vehicles to automatically travel along a predetermined path while maintaining the lanes thereof, one-way road, such as a straight line or a curved line, has ease of autonomous driving control, but left/right turn or straightforward driving at an intersection may have a high risk of colliding with an obstacle, and in order to prevent the risk of collision from being increased, precise control is needed for the vehicle travel at the intersection.

In particular, an intersection area has various types of travel guide lanes (e.g. straightforward guiding line, left turn guiding line, and the like) in a mixed form, and in some intersection areas, any guide lane may not exist, which makes the autonomous driving control significantly difficult.

SUMMARY

Therefore, it is an object of the present disclosure to provide an apparatus for calculating a vehicle travel path capable of enhancing the precision of a vehicle movable path in an intersection area by calculating a precise position of an intersection point corresponding to a crossing point of lanes at an intersection and calculating a vehicle travel path on the basis of the calculated position of the intersection point.

It is another object of the present disclosure to provide an apparatus for controlling a vehicle capable of providing safe autonomous driving at an intersection by calculating the positions of a plurality of intersection points at an intersection, calculating a vehicle movement path through the calculated positions, and automatically controlling the travel of the vehicle on the basis of the vehicle movement path.

Additional aspects of the invention will be set forth in part in the description which follows and, in part, will be obvious from the description, or may be learned by practice of the invention.

In accordance with one aspect of the present invention, an apparatus for controlling a vehicle includes: an image sensor disposed on a vehicle to have a field of view of an exterior of the vehicle and configured to capture image data; a map storage configured to store map information of a surrounding of the vehicle; and a controller comprising a processor for processing the image data captured by the image sensor, wherein the controller is configured to: identify an intersection area based on at least part of the processing of the image data captured by the image sensor; determined intersection point information about a plurality of intersection points in the intersection area based on at least part of the processing of the image data captured by the image sensor, and determined a vehicle travel path in the intersection area using the determined intersection point information and control travel of the vehicle based on the determined vehicle travel path.

The controller may identify an intersection area based on at least one of the map information or image sensor information, determine positions and a number of a plurality of intersection points based on a lane continuing characteristic and a lane crossing characteristic in the intersection area, and determine the vehicle travel path in the intersection area based on the determined positions and the number of the intersection points.

The lane continuing characteristic may include information about a lane cut position in which a lane is cut by a predetermined length or more in the intersection area, the lane crossing characteristic includes information about a lane crossing position in which two lanes cross each other, and the controller may determine the lane cut position and the lane crossing position to be the intersection point.

The controller may determine a number of available travel lanes at the intersection and a shape of the intersection based on of at least one of information about a number of lanes sensed in the intersection area and information about a type of a signal lamp.

The controller may, among the intersection points: set positions of a 1-1 intersection point and a 1-2 intersection point corresponding to a left side intersection point and a right side intersection point of a travel lane on which the vehicle travels as a first reference position; set one of positions of a 2-1 intersection point and a 2-2 intersection point corresponding to a left side intersection point and a right side intersection point of a left side distant lane located on a left distant side of the travel lane, a position of a 3-1 intersection point corresponding to a left side intersection point of a right side near lane located on a right near side of the travel lane, and positions of a 4-1 intersection point and a 4-2 intersection point corresponding to a left side intersection point and a right side intersection point of an opposite lane of the travel lane as a second reference position; and generate vehicle travel path information passing through the first reference position and the second reference position.

The vehicle travel path information may include left turn travel path information comprising a 1-1 curve having a predetermined first radius of curvature and passing through the 1-1 intersection point and the 2-1 intersection point and a 1-2 curve having a predetermined second radius of curvature and passing through the 1-2 intersection point and the 2-2 intersection point.

The first radius of curvature may be a first distance between the 1-1 intersection point and the 2-1 intersection point, and the second radius of curvature may be a second distance between the 1-2 intersection point and the 2-2 intersection point.

The controller may determine a vehicle travel path in a lane based on lateral offset information of the vehicle immediately before entering the intersection, heading angle information of the vehicle with respect to the lane, and a curvature of the vehicle travel path at the intersection.

In accordance with another aspect of the present invention, an apparatus for calculating a path of a vehicle, the apparatus comprises: an intersection identifying unit configured to identify an intersection area using at least part of image data from an image sensor disposed on a vehicle to have a field of view of an exterior of the vehicle and configured to capture image data; an intersection point information calculating unit configured to calculate positions and a number of a plurality of intersection points, based on a lane continuing characteristic and a lane crossing characteristic in the intersection area; and a travel path calculating unit configured to calculate one or more vehicle travel paths in the intersection area based on the positions and the number of the intersection points.

The lane continuing characteristic may comprise information about a lane cut position in which a lane is cut by a predetermined length or more in the intersection area, the lane crossing characteristic may include information about a lane crossing position in which two lanes cross each other, and the intersection point information calculating unit may determine the lane cut position and the lane crossing position as the intersection point.

In accordance with another aspect of the present invention, a method of controlling a vehicle, the method comprises: identifying an intersection area based on at least one of map information and image data captured by an image sensor; determining positions and a number of a plurality of intersection points based on a lane continuing characteristic and a lane crossing characteristic in the intersection area; determining a vehicle travel path in the intersection area based on the positions and the number of the intersection points; and controlling travel of the vehicle based on the determined vehicle travel path.

The lane continuing characteristic may comprise information about a lane cut position in which a lane is cut by a predetermined length or more in the intersection area, the lane crossing characteristic may include information about a lane crossing position in which two lanes cross each other, and the determining positions and a number of the plurality of intersection points may include determining the lane cut position and the lane crossing position to be the intersection point.

The method of controlling the vehicle may further comprises determining a number of available travel lanes at the intersection and a shape of the intersection based on at least one of information about a number of lanes sensed in the intersection area and information about a type of a signal lamp.

The determining the vehicle travel path in the intersection area may include, among the intersection points: setting positions of a 1-1 intersection point and a 1-2 intersection point corresponding to a left side intersection point and a right side intersection point of a travel lane on which the vehicle travels as a first reference position; setting one of positions of a 2-1 intersection point and a 2-2 intersection point corresponding to a left side intersection point and a right side intersection point of a left side distant lane located on a left distant side of the travel lane, a position of a 3-1 intersection point corresponding to a left side intersection point of a right side near lane located on a right near side of the travel lane, and positions of a 4-1 intersection point and a 4-2 intersection point corresponding to a left side intersection point and a right side intersection point of an opposite lane of the travel lane as a second reference position; and generating vehicle travel path information passing through the first reference position and the second reference position.

The vehicle travel path information may include left turn travel path information comprising a 1-1 curve having a predetermined first radius of curvature and passing through the 1-1 intersection point and the 2-1 intersection point and a 1-2 curve having a predetermined second radius of curvature and passing through the 1-2 intersection point and the 2-2 intersection point.

The first radius of curvature may be a first distance between the 1-1 intersection point and the 2-1 intersection point, and the second radius of curvature may be a second distance between the 1-2 intersection point and the 2-2 intersection point.

The determining the vehicle travel path in the intersection area may include determining a vehicle travel path in a lane based on lateral offset information of the vehicle immediately before entering the intersection, heading angle information of the vehicle with respect to the lane, and a curvature of the vehicle travel path at the intersection.

In accordance with another aspect of the present invention, an apparatus for controlling a vehicle, the apparatus comprises: an image sensor disposed on a vehicle to have a field of view of an exterior of the vehicle and configured to capture image data; a non-image sensor disposed on the vehicle and configured to capture sensing data to sense one of objects around the vehicle; a vehicle dynamics sensor disposed on the vehicle and configured to sense information related to travel of a vehicle; and an integrated controller configured to process at least one of image data captured by the image sensor and sensing data captured by the non-image sensor, wherein the integrated controller is configured to, based on at least part of the processing of the image data captured by the image sensor (i) identify an intersection area, (ii) determine intersection point information comprising positions and a number of a plurality of intersection points based on a lane continuing characteristic and a lane crossing characteristic in the intersection area, (iii) determine one or more vehicle travel path in the intersection area using the determined intersection point information, and iv) control travel of the vehicle based on the determined vehicle travel path.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
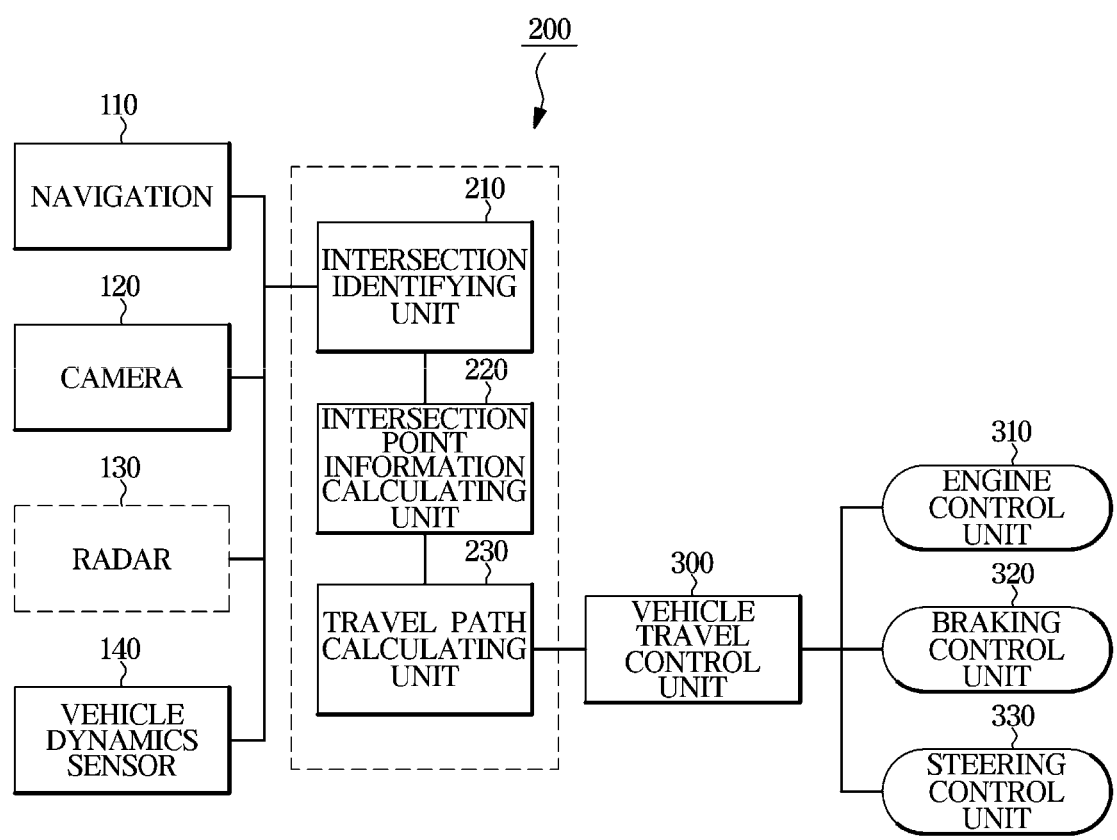
FIG. 1 is a diagram illustrating the overall system configuration of an apparatus for generating a vehicle path and an apparatus for controlling a vehicle having the same according to the present embodiment.

Hereinafter, the exemplary embodiment of the present disclosure will be described with reference to the accompanying drawings in detail. In assigning reference numerals to elements, the same reference numerals are used to designate the same elements throughout the drawings. In describing the present invention, detailed descriptions that are well-known but are likely to obscure the subject matter of the present invention will be omitted in order to avoid redundancy.

Although the terms "first," "second," "A," "B," "(a)", "(b)", etc. may be used to describe various components, the terms do not limit the corresponding components and the nature, order, sequence, or number thereof, but are used only for the purpose of distinguishing one component from another component. It will be understood that when an element is referred to as being "connected" or "coupled" to another element, it can be directly connected or coupled to the other element or intervening elements may be present.

Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

Also, when a part "includes" or "comprises" an element, unless there is a particular description contrary thereto, the part may further include other elements, not excluding the other elements.

An expression used in the singular encompasses the expression of the plural, unless it has a clearly different meaning in the context. FIG. 1 is a diagram illustrating the overall system configuration of an apparatus for generating a vehicle path and an apparatus for controlling a vehicle having the same according to the present embodiment.

The apparatus for controlling the vehicle according to the present embodiment includes a camera 120 serving as an image sensor, a vehicle dynamics sensor 140, and other vehicle sensor, a navigation device 110 including map information, a vehicle path generating device 200 identifying an intersection, recognizing an intersection point at an intersection, and generating a vehicle path, and a vehicle travel control unit 300 controlling an engine unit, a steering unit, a braking unit, and the like of the vehicle for the vehicle to travel according to the generated vehicle path.

The camera 120 performs a function of recognizing an object around the vehicle by analyzing a surrounding image of the vehicle. The camera 120 according to the embodiment performs a function of generating/outputting lane information by recognizing a lane from a front image and front lateral side images of the vehicle, a function of providing stop line information of a stop line around the vehicle, and a function of generating/outputting signal lamp information about the type of a signal lamp (e.g., the number of green signals) by sensing signal lamps in front of the vehicle.

The camera for the vehicle used in the present embodiment may be expressed by different terms, such as an image system, a vision system, an image sensor, and the like. The camera for the vehicle may include a front camera having a field of view corresponding to a front of the vehicle, a rear camera having a field of view corresponding to a rear of the vehicle, and a rear lateral side camera having a field of view corresponding to sides and rear of the vehicle, and in some cases, may selectively include at least one of the cameras of such various directions.

The camera performs a function of capturing image data of a surrounding of a vehicle and delivering the captured image data to a processor or a controller. The vision system or image sensor according to the present embodiment may further include an electronic control unit (ECU) or an image processor configured to process the captured image data and display the processing result on a display.

In addition, the vision system or image sensor according to the present embodiment may further include an appropriate data link or communication link, such as a vehicle network bus or the like, for data transmission or signal communication from the camera to the image processor. In addition, the vehicle to which the present embodiment is applied may further include a non-image sensor 104, such as a radar sensor or an ultrasonic sensor.

In particular, lane information may include lane continuing characteristic information and lane crossing characteristic information such that the intersection point information calculation unit identifies an intersection point in an intersection area, as will be described below.

In this case, the lane continuing characteristic information may include information about whether a lane (including a middle lane and a shoulder lane) has a discontinuous section of a predetermined length or longer, and in the case of existence of the discontinuous section, include position information of a start point and an end point of the discontinuous section.

In addition, the lane crossing characteristic information may include information about whether a leftmost or rightmost lane among lanes crosses another lane perpendicular thereto, and in the case of the crossing, include position information of the crossing position.

Map information included in the navigation device 110 includes information about coordinates of a travel road on which the vehicle travels, the number and shape (curvature) of lanes of the travel road, and the like, and the navigation device is provided with a function of displaying the current position of the vehicle recognized through a GPS (global positioning system) on the map information.

In addition, the apparatus for controlling the vehicle according to the present embodiment may further include a non-image sensor for detecting an object around the vehicle, such as a radar sensor 130 and an ultrasonic sensor, in addition to the image sensor.

The radar sensor represents a sensor for transmitting a high frequency radar signal of several tens of GHz, receiving a signal returning by being reflected from the object, and calculating the distance, angle, relative velocity of the object from a period between a reception time point of the received reflection signal and a transmission time point, a phase change of electromagnetic waves, and the like.

The radar sensor or radar system used for the present invention may include at least one radar sensor unit, for example, may include one or more of a front radar sensor mounted in the front of the vehicle, a rear radar sensor mounted in the rear of the vehicle, and a side or side-rear radar sensor mounted in each side of the vehicle. Such a radar sensor or radar system analyzes the transmitted signal and the received signal to process data to thereby detect information about an object, for which an ECU or a processor may be provided. Data transmission or signal communication from the radar sensor to the ECU may be implemented using a communication link, such as an appropriate vehicle network bus.

Such a radar sensor includes one or more transmission antennas for transmitting radar signals and one or more reception antennas for receiving reflected signals received from an object.

Meanwhile, the radar sensor according to the present embodiment may adopt a multi-dimensional antenna array and a signal transmission/reception scheme of multiple input multiple output (MIMO) to form an imaginary antenna aperture larger than an actual antenna aperture.

For example, a two-dimensional antenna array is used to achieve horizontal and vertical angle precision and resolution. When a two-dimensional radar antenna array is used, signals are transmitted and received by two individual scans of horizontal and vertical scans (time multiplexed), and MIMO may be used separately from the two-dimensional radar horizontal and vertical scans (time multiplexed).

In more detail, the radar sensor according to the present embodiment may employ a two-dimensional antenna array configuration including a transmission antenna unit including a total of 12 transmission antennas (Tx) and a reception antenna unit including a total of 16 reception antennas (Rx), resulting in an arrangement of a total of 192 imaginary reception antennas.

In this case, the transmitting antenna unit includes three transmission antenna groups each including four transmission antennas, and a first transmission antenna group is spaced a predetermined distance from a second transmission antenna group in the vertical direction, and the first or second transmission antenna group is spaced a predetermined distance D from a third transmission antenna group in the horizontal direction.

In addition, the reception antenna unit may include four reception antenna groups each including four reception antennas, and the respective reception antenna groups are disposed to be spaced in the vertical direction, and such a reception antenna unit may be disposed between the first transmission antenna group and the third transmission antenna group spaced in the horizontal direction.

Further, according to another embodiment, the antennas of the radar sensor are arranged in a two-dimensional antenna array, for example, a Rhombus arrangement by each antenna patch to reduce unnecessary side lobes.

Alternatively, the two-dimensional antenna array may include a V-shape antenna array in which a plurality of radiating patches are arranged in a V-shape, and more specifically include two V-shape antenna arrays. At this time, a single feed is made to an apex of each V-shape antenna array.

Alternatively, the two-dimensional antenna array may include a X-shape antenna array in which a plurality of radiating patches are arranged in a X-shape, and more specifically, include two X-shape antenna arrays. At this time, a single feed is made to a center of each X-shape antenna array.

In addition, the radar sensor according to the present embodiment may use a MIMO antenna system to implement sensing accuracy or resolution in the vertical and horizontal directions.

More specifically, in the MIMO system, the transmission antennas may transmit signals having independent waveforms that are distinguished from each other. That is, each transmission antenna transmits an independent waveform signal that is distinguished from that of another transmission antenna, and each reception antenna may identify a transmission antenna from which a reflected signal from an object is transmitted among the transmission antennas, on the basis of the distinct waveforms of the signals.

In addition, the radar sensor according to the present embodiment may include a radar housing for accommodating a substrate including transmission and reception antennas and a circuit, and a radome forming the external appearance of the radar housing. In this case, the radome is formed of a material that may reduce the attenuation of transmitted and received radar signals, and the radome may be formed by outer surfaces of front and rear bumpers, grilles, side vehicle body, or vehicle components.

That is, the radome of the radar sensor may be disposed inside the vehicle grille, the bumper, the vehicle body, or the like, and may be disposed as a part forming the exterior surface of the vehicle, such as the vehicle grille, the bumper, the vehicle body, thereby improving the aesthetic quality of the vehicle while providing a convenience of mounting a radar sensor.

The ultrasonic sensor represents a sensor that emits ultrasonic waves having a frequency higher than that of sound waves and calculates the distance, the angle, and the relative velocity of the object by receiving and analyzing a reflected signal reflected from an object.

Since the image sensor, the radar sensor, or the ultrasonic sensor according to the present embodiment may be implemented using an image sensor, a radar sensor or a ultrasonic sensor that are widely used for a general vehicle, a detailed description thereof will be omitted.

In addition, the apparatus for controlling the vehicle according to the present embodiment may further include the vehicle dynamics sensor 140 for sensing information regarding a vehicle travelling.

The vehicle dynamics sensor 140 may include a vehicle velocity sensor, a yaw rate sensor, an acceleration sensor (G sensor), and the like, but is not limited thereto, and may include all types of sensors used to sense the behavior of a vehicle when the vehicle travels along a vehicle travel path generated according to the present embodiment.

The vehicle path generating device 200 according to the present embodiment may include an intersection identifying unit 210 configured to identify an intersection area on the basis of at least one of map information and image sensor information, an intersection point information calculating unit 220 configured to calculate the positions and the number of a plurality of intersection points on the basis of a lane continuing characteristic and a lane crossing characteristic in an intersection area, and a travel path calculating unit 230 configured to calculate one or more vehicle travel paths in the intersection area on the basis of the positions and the number of the intersection points.

The intersection identifying unit 210, the intersection point information calculating unit 220, and the travel path calculating unit 230 constituting the vehicle path generating device 200 may be integrated and operate as a single controller, and such a controller may include a processor for processing image data captured by the camera.

In addition, such a controller may be operable to identify the intersection area on the basis of at least part of the processing of the image data captured by the image sensor, calculate intersection point information about a plurality of intersection points in the intersection area, calculate one or more vehicle travel paths in the intersection area using the calculated intersection point information, and control travel of the vehicle according to the calculated vehicle travel path.

Such a controller may be implemented as an integrated control unit (e.g., a domain control unit: DCU) or an integrated controller that integrates a function of receiving and processing pieces of information of various vehicle sensors or relaying transmission and reception of sensor signals, a function of generating a vehicle travel path at an intersection, generating a vehicle travel control signal on the basis of the generated vehicle travel path, and transmitting the generated vehicle travel control to a steering control mode or braking control mode to control the behavior of the vehicle according to the present disclosure, and other function, but the implementation of the controller is not limited thereto.

Such an integrated controller (DCU) is operable to, on the basis of the function of processing image data captured by the image sensor and sensing data captured by the non-image sensor and at least part of the processing of the image data captured by the image sensor, (i) identify an intersection area, (ii) calculate the positions and the number of a plurality of intersection points on the basis of a lane continuing characteristic and a lane crossing characteristic in the intersection area, (iii) calculate one or more vehicle travel paths in the intersection area using the calculated intersection point information, and (iv) control travel of the vehicle according to the calculated vehicle travel path.

Hereinafter, the functions constituting the vehicle path generating device 2000 according to the present embodiment will be described in detail.

The intersection identifying unit 210 may determine that the vehicle enters an intersection area in response to satisfying at least one condition of: an intersection area exists in front of the vehicle from the map information received from a navigation system and the current position of the vehicle through the GPS; and vehicle frontal image information received from the image sensor includes signal lamp information and stop line information.

The navigation device 110 includes map information, and the current position information of the vehicle is calculated using a GPS receiving device mounted on the vehicle such that a position at which the vehicle is located in the map information is identified. Accordingly, the intersection identifying unit 210 may determine whether the vehicle enters the intersection area on the basis of the map information received from the navigation device 110 and the current position information of the vehicle.

In addition, the image sensor 120 may identify a stop line and a crosswalk that are distant from or adjacent to the vehicle in the front or sides of the vehicle from the photographed image, and may identify the existence and type of the signal lamp located in front of the vehicle using a traffic signal recognition (TSR).

Accordingly, the intersection identifying unit 210, in response to determining that a signal lamp or a stop line exists in front of the vehicle from the information received from the image sensor 120, may determine that the vehicle enters the intersection area. In this case, the signal lamp information may be limited to including a direction change signal, such as a left turn or right turn.

Thereafter, the intersection point information calculating unit 220 included in the vehicle path generating device 200 according to the present embodiment performs a function of calculating the positions and the number of a plurality of intersection points on the basis of the lane continuing characteristic and the lane crossing characteristic in the intersection area.

In this case, the lane continuing characteristic may include information about whether a discontinuous lane that is cut by a predetermined length or more exists in an intersection area and information about a cut position of the discontinuous lane cut by the predetermined length.

In addition, the lane crossing characteristic may include information about a lane crossing position in which two lanes cross each other in the intersection area.

In this case, the intersection point information calculating unit 220 may determine the cut position of the discontinuous lane and the crossing position as the intersection point.

The lane continuing characteristic and the lane crossing characteristic may be identified from the map information received from the navigation device or the image sensing information received from the image sensor.

That is, the intersection point information calculating unit 220 may identify whether a discontinuous lane exists and the coordinates of the cut position of the discontinuous lane on the basis of the received map information, or may obtain information about whether a lane is cut and information about the cut position from the image captured by the image sensor.

That is, the intersection point information calculating unit 220 may identify whether crossing lanes exist and the coordinates of the crossing position of the crossing lanes on the basis of the received map information, or may obtain information about whether lanes cross and information about the crossing position from the image captured by the image sensor.

The intersection point information calculating unit 220 may calculate the coordinate information of an intersection point with respect to the current position of the vehicle, and information about the number of intersection points existing in a straightforward area/left side area/right side area. Details thereof will be described below with reference to FIG. 3 and other drawings.

Although not shown, the vehicle path generating device 200 according to the present embodiment may further include an intersection form determining unit configured to determine the number of available travel lanes in the intersection area on the basis of information about the number of lanes sensed in the intersection area and the information about the type of the signal lamp.

The intersection form determining unit may further determine the form of the intersection, that is, the number of roads crossing each other, in addition to the information about the number of available travel lanes at the intersection.

The intersection form determining unit may determine the number of lanes in a travelling direction of the subject vehicle in the intersection area (the same as the number of straightforward travel lanes on the opposite side in the intersection) and the number of travel lanes on the left and the right in the travelling direction of the vehicle.

For example, the intersection form determining unit may recognize that the number of lanes in a travelling direction in which the subject travels in the intersection area, and the number of straightforward travel lanes on the opposite side at the intersection correspond to one of a one-way one lane road, a one-way two lane road, and a one-way three road, and similarly recognize the number of lanes on the left side and the right side in a travelling direction of the vehicle also corresponds to one of a one-way one lane road, a one-way two lane road, and a one-way three road.

To this end, the intersection form determining unit may further use information about the type of the signal lamp included in the image sensor information to determine the form of the intersection in addition to the information about the number of available travel lanes.

For example, when the signal lamp type information included in the image sensor information includes four types of signals including a green signal (straight), a left turn signal, a yellow signal (standby), and a red signal (stop), the form of the intersection is determined to be a three-way street in which a left turn lane diverges from a straightforward lane or a four-way street in which a straightforward lane crosses left and right side travel lanes.

In addition, when the signal lamp type information included in the image sensor information includes five types of signals including a green signal (straight), a left turn signal, a right turn signal, a yellow signal (standby), and a red signal (stop), the form of the intersection is determined to be a five-way street in which five roads cross each other.

The information about the number of available travel lanes or the intersection form information determined by the intersection form determining unit may be used for a process of calculating the vehicle travel path at the intersection by the travel path calculating unit, which will be described below.

In addition, the travel path calculating unit 230 included in the vehicle path generating device 200 according to the present embodiment serves to calculate one or more vehicle travel paths in the intersection area on the basis of the positions and the number of the intersection points in the intersection area calculated by the intersection point information calculating unit 220.

The travel path calculating unit 230 may further use turn signal operation information of the vehicle to set the travelling direction of the vehicle.

More specifically, the travel path calculating unit 230 among the intersection points: set positions of a 1-1 intersection point and a 1-2 intersection point corresponding to a left side intersection point and a right side intersection point of a travel lane on which the vehicle travels as a first reference position; set one of, positions of a 2-1 intersection point and a 2-2 intersection point corresponding to a left side intersection point and a right side intersection point of a left side distant lane located on a left distant side of the travel lane, a position of a 3-1 intersection point corresponding to a left side intersection point of a right side near lane located on a right near side of the travel lane, and positions of a 4-1 intersection point and a 4-2 intersection point corresponding to a left side intersection point and a right side intersection point of an opposite lane of the travel lane as a second reference position; and generate vehicle travel path information passing through the first reference position and the second reference position.

In this case, the vehicle travel path information may include left turn travel path information including a 1-1 curve having a predetermined first radius of curvature and passing the 1-1 intersection point and the 2-1 intersection point and a 1-2 curve having a predetermined second radius of curvature and passing the 1-2 intersection point and the 2-2 intersection point.

In this case, the first radius of curvature is a first distance that is a straight line distance between the first-first intersection point and the second-first intersection point, and the second radius of curvature is the first-second intersection point and the second-second intersection point. The first distance and the second curvature may be the inverse of the radius of the first and second curvatures.

Figure 7:
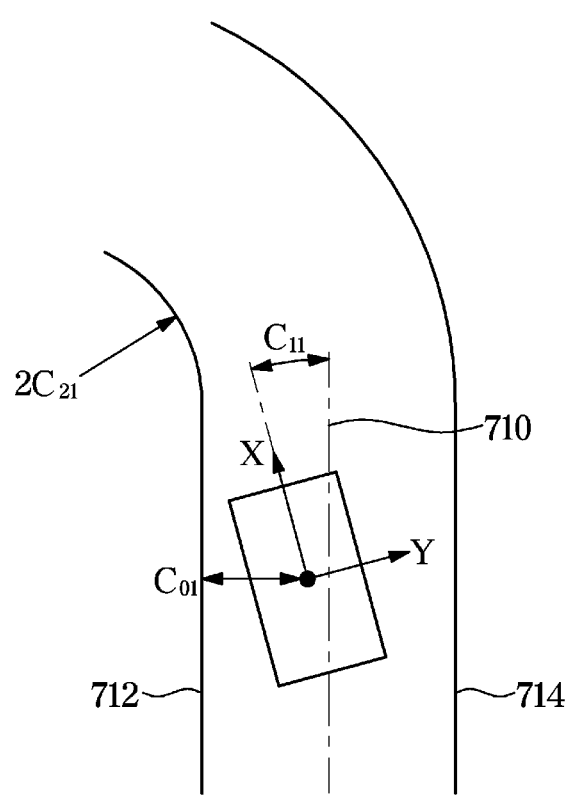
FIG. 7 is a diagram illustrating a lane modeling for calculating a vehicle travel path according to the present embodiment.

The travel path calculating unit 230 may calculate a vehicle travel path in a lane on the basis of lateral offset information of the vehicle immediately before entering the intersection, heading angle information of the vehicle for the lane, and a radius of curvature of the vehicle travel path at the intersection, and to this end, the travel path calculating unit 230 may use a path generation model as shown in FIG. 7.

The process of calculating the vehicle travel path by the travel path calculating unit 230 will be described in more detail below with reference to FIGS. 4 to 7.

In addition, the vehicle travel control unit 300 included in the apparatus for controlling the vehicle according to the present embodiment may serve to control the engine, steering, and braking units of the vehicle for the vehicle to travel according to the vehicle travel path generated by the travel path calculating unit 230, and to this end, may provide control commands to an engine control unit 310, a steering control unit 330, and a braking control unit 320.

Meanwhile, the intersection identifying unit 210, the intersection point information calculating unit 220, the travel path calculating unit 230, and the vehicle travel control unit 300 included in the apparatus for controlling the vehicle or the vehicle path generating device 200 may be implemented as constituent modules of a vehicle control system according to the present embodiment or modules of an ECU therefor.

The constituent modules of the vehicle control system or the ECU may include a processor, a storage device, such as a memory, and a computer program capable of performing a specific function, and the intersection identifying unit 210, the intersection point information calculating unit 220, the travel path calculating unit 230, and the vehicle travel control unit 300 may be implemented as a software module capable of performing the respective unique functions.

Since such software may be sufficiently coded by those skilled in the art from the matters described in the specification, detailed description of specific forms of the software will be omitted.

Figure 2:
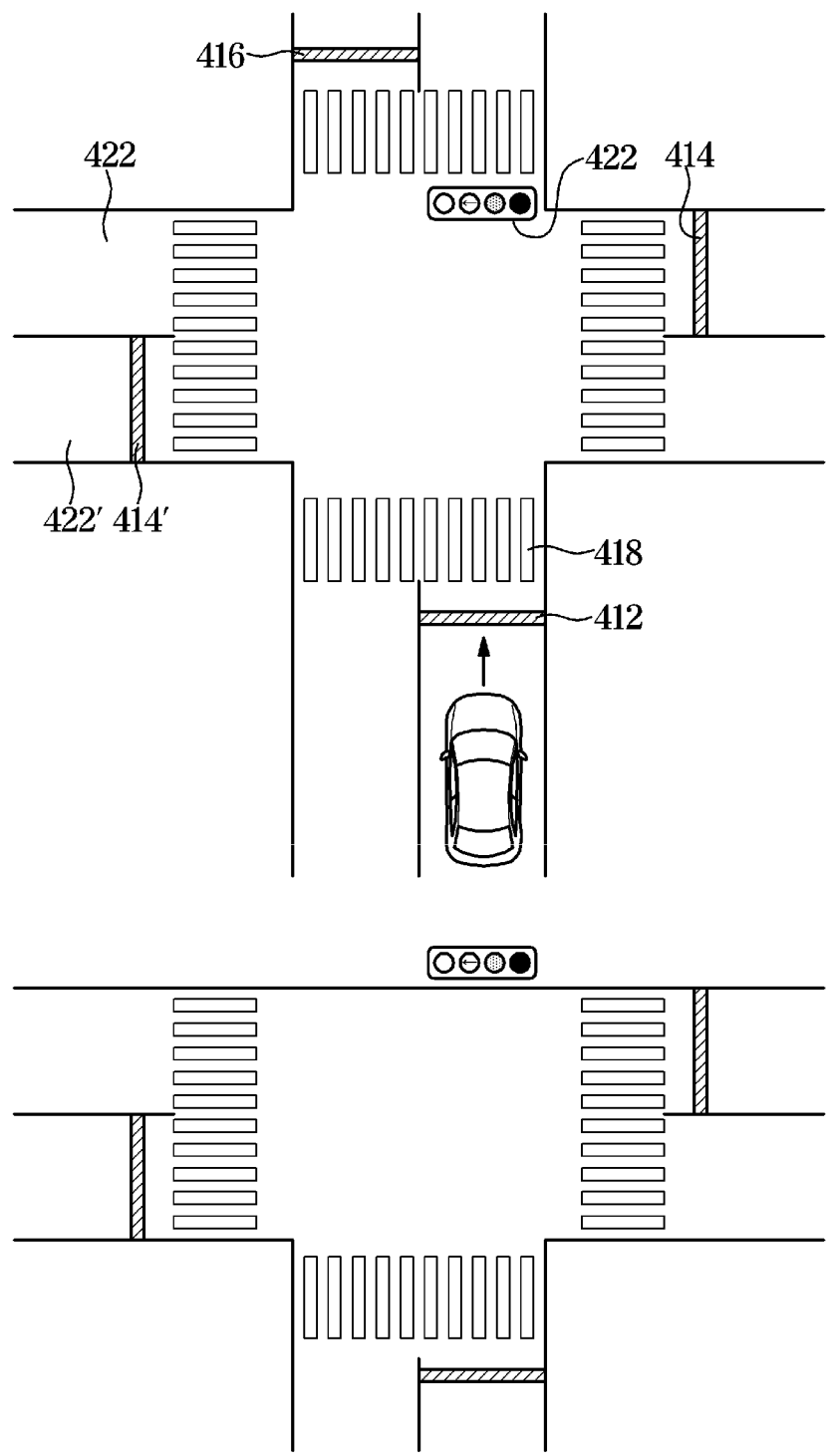
FIG. 2 is a diagram illustrating a state of an intersection to which the present embodiment is applied.
Figure 3:
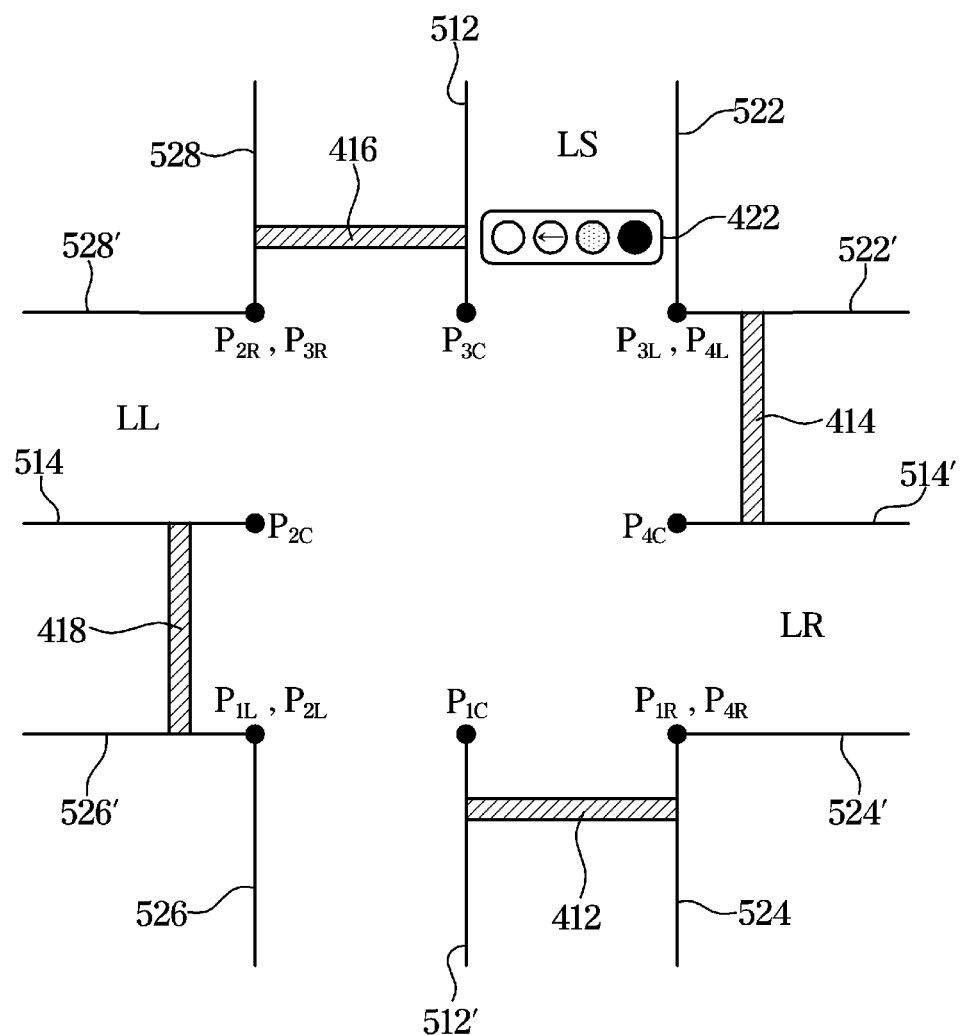
FIG. 3 is a diagram illustrating a configuration that specifies a plurality of intersection points in an intersection area according to the present embodiment.

FIG. 2 is a diagram illustrating a state of an intersection to which the present embodiment is applied, and FIG. 3 is a diagram illustrating a configuration that specifies a plurality of intersection points in an intersection area according to the present embodiment.

The upper part of FIG. 2 illustrates a four-way intersection in which four roads cross each other and the lower part of FIG. 2 illustrates a T-shaped three-way intersection.

Referring to FIG. 2, the intersection area to which the present embodiment is applied has a stop line mark 412 and a crosswalk mark 418 at an intersection entry position of a travel lane on which the subject vehicle travels, and a signal lamp 422 is located in front of the vehicle.

In addition, a left side reverse travelling lane 422' is located on the left near side in the travelling direction of the vehicle, a left side forward travelling lane 422 is located on the left distant side, and a left side stop line mark 414' is displayed on the left side reverse travelling lane 422'.

Similarly, a right side forward travelling lane is located on the right near side in the travelling direction of the vehicle, a right side reverse travelling lane is located on the right distant side, and a right side stop line mark 414 is displayed on the right side reverse travelling lane.

On the opposite side in the travelling direction of the vehicle, a straight forward travelling lane that connects parallel to the lane on which the vehicle travels is located, a straight reverse travelling lane is located next to the straight forward travelling lane, and a stop line mark 416 is displayed on the straight reverse travelling lane.

As such, a stop line is generally shown only on a reverse travelling lane on which the vehicle is unable to travel among straight/left/right lanes.

FIG. 3 is a diagram illustrating a configuration for specifying a plurality of intersection points in an intersection area in the case of a one-way one lane road according to the present embodiment.

The intersection point information calculating unit 220 according to the present embodiment may calculate the positions and the number of a plurality of intersection points on the basis of the lane continuing characteristic and the lane crossing characteristic in the intersection area from the map information received from the navigation device and/or the image sensor information, in which the intersection points are denoted as $P_{1C}$, $P_{1L}$, $P_{1R}$ and the like.

In the method of denoting the intersection points, i of $P_{ij}$ is an index indicating one of four sides of the intersection, in which a vehicle travelling side is 1, the left side is 2, the opposite side is 3, and the right side is 4, and j indicates a left/right position of an intersection point in the corresponding side, in which C denotes the center, L denotes the left, and R denotes the right.

Referring to FIG. 3, the intersection point information calculating unit 220 may determine the coordinates of a plurality of intersection points $P_{ij}$ with respect to the current position of the vehicle, on the basis of coordinates of a cut position of a discontinuous lane or a lane crossing position obtained from the map information or the image information.

For example, the intersection point information calculating unit 220 identifies that a center line on a lane on which the vehicle travels is cut into a near center line 512' and a distant center line 512 by a predetermined distance or more, and specifies the cut positions $P_{1C}$ and $P_{3C}$ as intersection points.

In addition, a point $P_{1R}$ at which a right side line 524 of the vehicle travelling lane crosses a right side line 524' of the right side lane is specified as an intersection point.

In this way, a total of eight intersection points are specified at the four-way intersection with one lane for each way as shown in FIG. 3.

That is, the positions of three intersection points $P_{1C}$, $P_{1R}$, and $P_{1L}$ are specified on the vehicle travelling side, the positions of three intersection points $P_{3C}$, $P_{3R}$, and $P_{3L}$ are specified on the opposite side of the vehicle travelling side, and the positions of three intersection points $P_{2C}$, $P_{2R}$, and $P_{2L}$ are specified on the left side of the vehicle travelling side, and the positions of three intersection points $P_{4C}$, $P_{4R}$, and $P_{4L}$ are specified on the right side of the vehicle traveling side.

The intersection point at which two sides cross each other may be denoted as two different indications. For example, $P_{3R}$ denoting the rightmost intersection point of the opposite side may be used in the same sense as $P_{2R}$ denoting the rightmost intersection point of the left side.

Each of the intersection points may be represented by a coordinate value (x, y) in a two-dimensional coordinate system having the current position of the vehicle or one of the intersection points of the vehicle traveling lane as the origin.

Among the intersection points, left and right intersection points of a travel lane on which the vehicle travels are $P_{1C}$ and $P_{1R}$, respectively, and left and right intersection points of a straight forward travelling lane LS on the opposite side on which the vehicle is able to travel straightforward are $P_{3C}$ and $P_{3L}$, left and right intersection points of a left side forward travelling lane LL on which the vehicle turns left and travels are $P_{2C}$ and $P_{2L}$, and left and right intersection points of a right side forward travelling lane LR on which the vehicle turns right and travels are $P_{4C}$ and $F_{1R}$.

Referring to FIG. 3, the intersection point information calculating unit 220 and the travel path calculating unit 230 according to the present embodiment may use the existence of a stop line mark to distinguish the forward travelling lane, which is an available travel lane, from the reverse travelling lane with respect to the current position of the vehicle.

That is, there is no stop line mark on the three forward travelling lanes available for straightforward/left turn/right turn with respect to the current position of the vehicle, based on which the left and right side intersection points of an available travel lane may be specified.

In particular, in order to improve the reliability of the identified intersection point, the intersection point information calculating unit 220 according to the present embodiment may check whether an interval between adjacent intersection points is greater or equal to a predetermined threshold value and whether a stop line mark is disposed between intersection points.

For example, in order to check the error or accuracy of the three intersection points specified on the opposite side, the intersection point information calculating unit 220 may check a condition whether the distance between the intersection points ($P_{3C}$-$P_{3R}$) and the distance between the intersection points ($P_{3C}$-$P_{3L}$) are each greater than or equal to a certain value level and a condition whether a stop line mark exists in one of an area between the intersection points $P_{3C}$ and $P_{3L}$ and an area between the intersection points $P_{3C}$ and $P_{3L}$ and does not exists in the remaining one, and may determine that the three intersection points $P_{3C}$, $P_{3R}$, and $P_{3L}$ are valid when the two conditions are satisfied.

In addition, the intersection point information calculating unit 220 may specify a lane in which a stop line mark exists among the two lanes defined by the specified three intersection points as a forward travelling lane.

As such, coordinate information of the specified intersection points may be stored/managed as intersection index information in the intersection area, and the travel path calculating unit 230 calculates an available travel path of the vehicle on the basis of the coordinate information of the intersection points.

Figure 4:
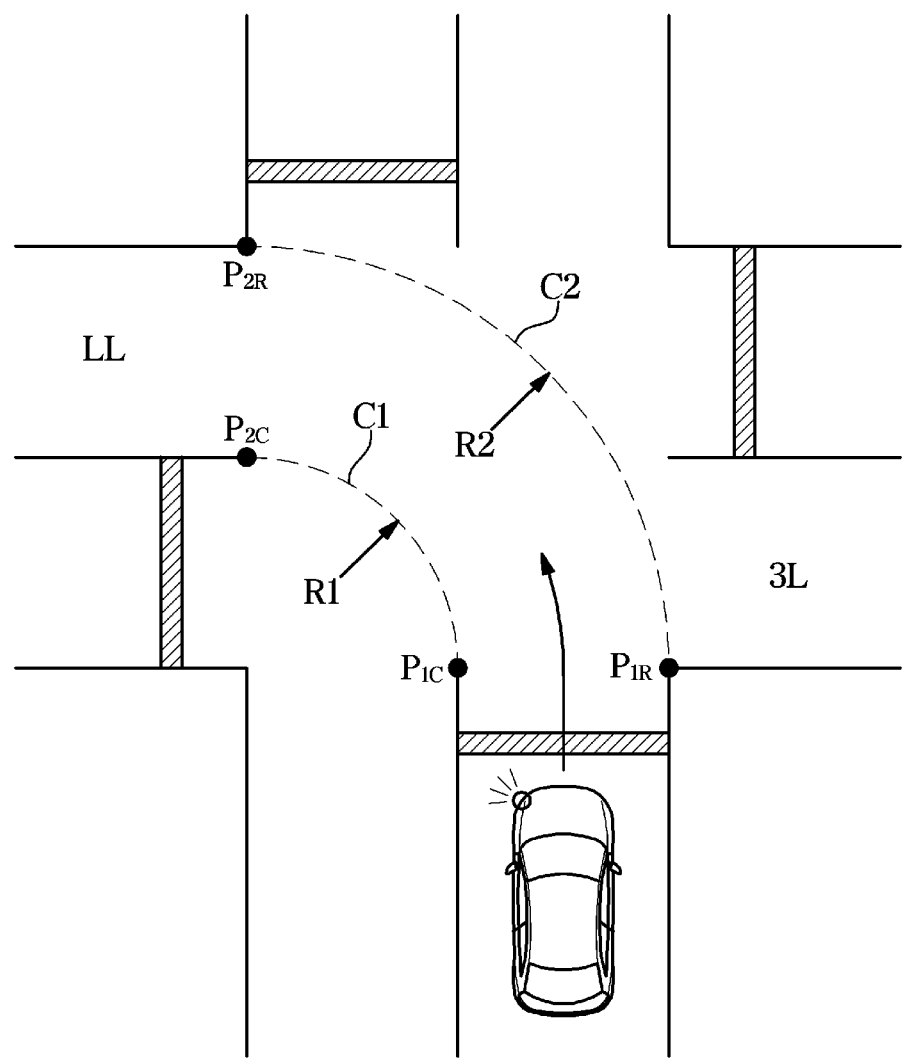
FIG. 4 is a diagram illustrating an example in which a left turn travel path of a vehicle is calculated on the basis of an intersection point at an intersection according to the present embodiment.
Figure 5:
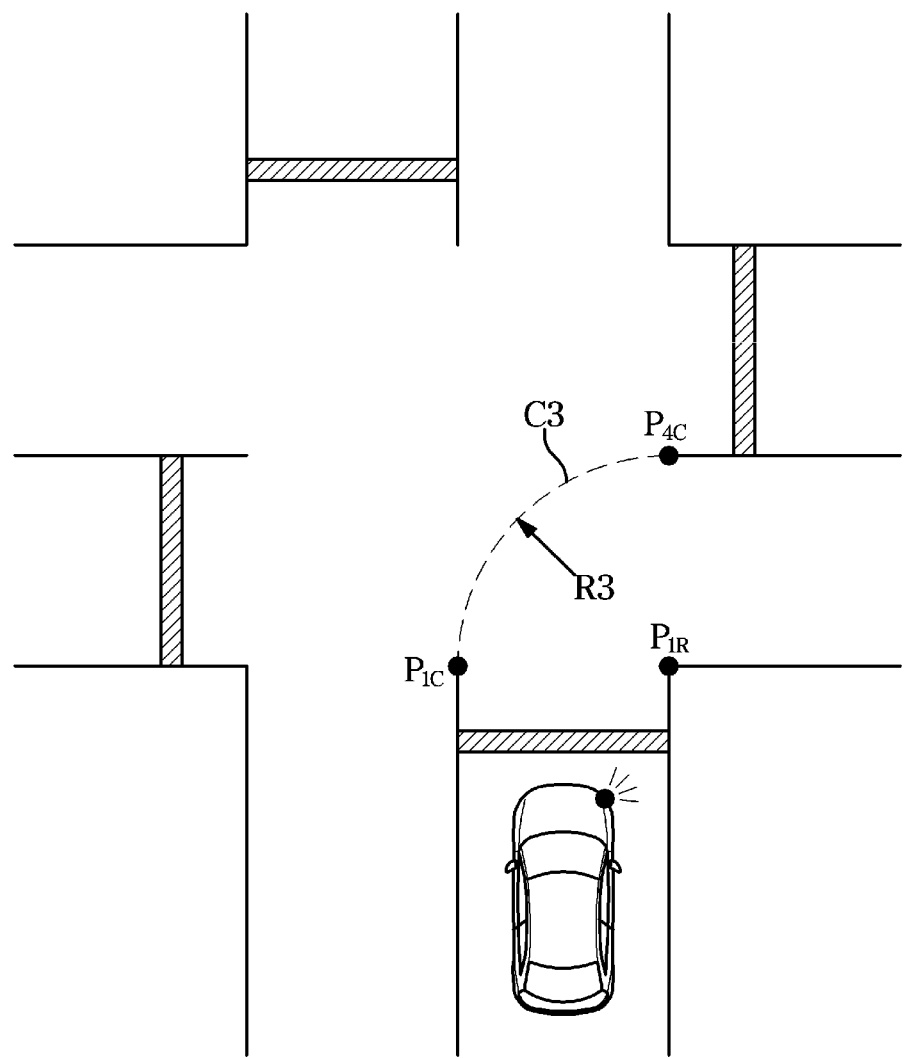
FIG. 5 is a diagram illustrating an example in which a right turn travel path of a vehicle is calculated on the basis of an intersection point at an intersection according to the present embodiment.

FIG. 4 is a diagram illustrating an example in which a left turn travel path of a vehicle is calculated on the basis of an intersection point at an intersection according to the present embodiment, and FIG. 5 is a diagram illustrating an example in which a right turn travel path of a vehicle is calculated on the basis of an intersection point at an intersection according to the present embodiment.

The travel path calculating unit 230 according to the embodiment calculates one or more vehicle travel paths in the intersection area on the basis of the positions and the number of the intersection points in the intersection area calculated by the intersection point information calculating unit 220, and details thereof will be described with reference to FIGS. 4 to 6.

FIGS. 4 and 5 illustrate an intersection area of a one-way one lane road as shown in FIG. 3. FIG. 4 shows an example of calculating a left turn travel path, and FIG. 5 shows an example of calculating a right turn travel path.

The travel path calculating unit 230 predicts a travelling direction of the vehicle at the intersection using turn signal operation information of the vehicle to determine the travelling direction of the vehicle, and when a left turn signal is activated, the travel path calculating unit 230 sets, among the intersection points, the positions of a 1-1 intersection point $P_{1C}$ and a 1-2 intersection point $P_{1R}$ corresponding to a left side intersection point and a right side intersection point of a lane on which the vehicle is currently being travelled as a first reference position, sets the positions of a 2-1 intersection point $P_{2C}$ and a 2-2 intersection point $P_{2R}$ corresponding to a left side intersection point and a right side intersection point of a left side distant lane (that is, a left side forward travelling lane) located on a left distant side of the travel lane as a second reference position, and generates vehicle travel path information passing through the first reference position and the second reference position.

That is, the travel path calculating unit 230 calculates a travel path including: a 1-1 curve C1 connecting the 1-1 intersection point $P_{1C}$, which is the left side intersection point of the lane on which the vehicle is currently travelled, to the 2-1 intersection point $P_{2C}$, which is the left side intersection point of the left side forward travelling lane, and having a first radius of curvature; and a 1-2 curve C2 connecting the 1-2 intersection point $P_{1R}$, which is the right side intersection point of the lane on which the vehicle is currently travelled, to the 2-2 intersection point $P_{2R}$, which is the right side intersection point of the left side forward travelling lane, and having a second radius of curvature.

In this case, the first radius of curvature R1 of the 1-1 curve C1 may be a first distance that is a straight line distance between the 1-1 intersection point $P_{1C}$ and the 2-1 intersection point $P_{2C}$, and the second radius of curvature R2 of the 1-2 curve C2 may be a second distance that is a straight line between the 1-2 intersection point $P_{1R}$ and the 2-2 intersection point $P_{2R}$, but the radius of curvature of each curve is not limited thereto.

In addition, referring to FIG. 5, when a right turn signal is activated, the travel path calculating unit 230 calculates a travel path including a 1-3 curve C3 connecting the 1-1 intersection point $P_{1C}$, which is the left side intersection point of the lane on which the vehicle is currently travelled, to the 4-1 intersection point $P_{4C}$, which is the left side intersection point of the right side forward travelling lane, with respect to the 1-2 intersection point $P_{1R}$, which is the right side intersection point of the lane on which the vehicle is currently travelled, and having a third radius of curvature.

In this case, the third radius of curvature R3 of the 1-3 curve C3 may be a third distance that is a straight line distance between the 1-1 intersection point $P_{1C}$ and the 4-1 intersection point $P_{4C}$, but the radius of curvature of each curve is not limited thereto.

Figure 6:
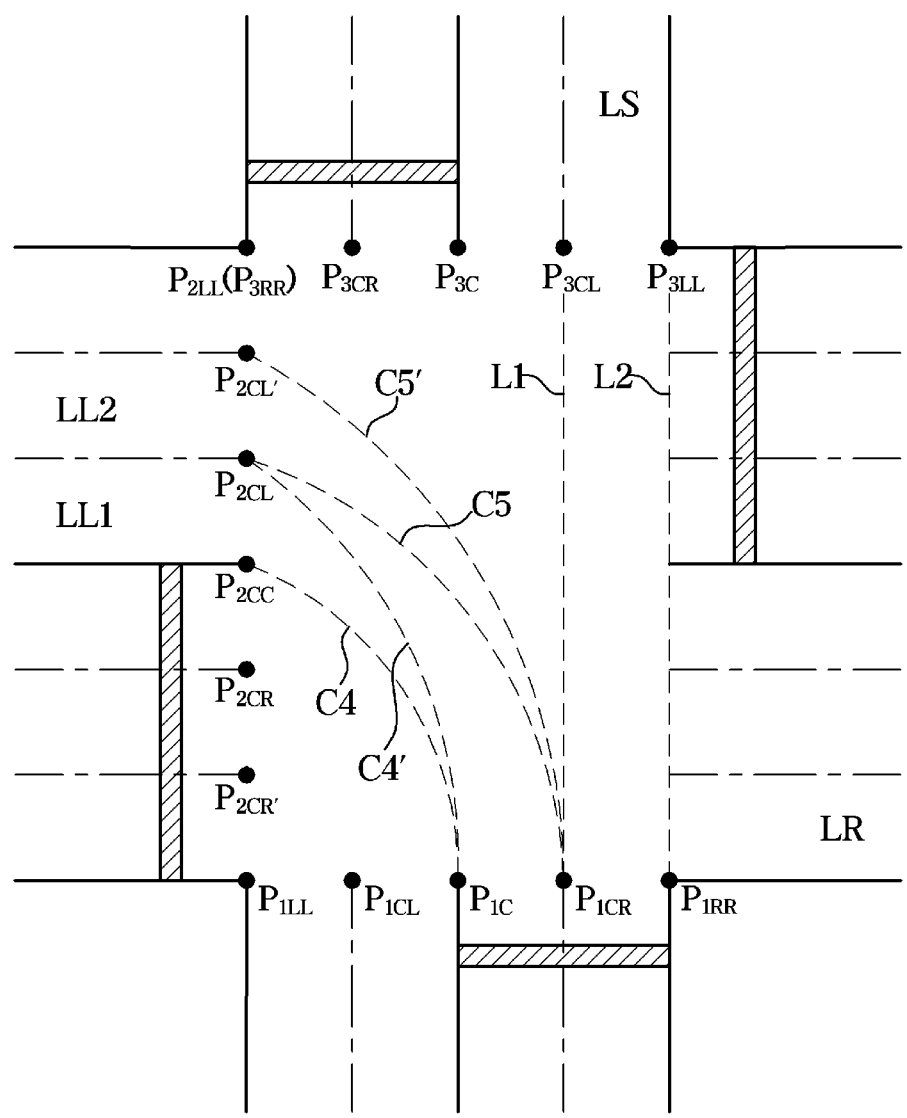
FIG. 6 is a diagram illustrating an example of an intersection point and a vehicle travel path in an intersection environment that is different from that shown in FIGS. 3 to 5.

FIG. 6 is a diagram illustrating an example of an intersection point and a vehicle travel path in an intersection environment that is different from that shown in FIGS. 3 to 5, in the case of having a one-way two lane road in a travelling direction and a one-way three lane road in the leftward and rightward directions.

In this case, similar to FIG. 3, the intersection point information calculating unit 220 specifies a total of twenty intersection points on the basis of information about whether a lane is cut, the position of the cut position, information about whether lanes cross each other, and the crossing position.

For the left turn, two or more left turn travel paths may be generated.

That is, a first left turn travel path C4 and C5 for the vehicle to travel from the current travelling lane along a first left side forward travelling lane LL1, which is the inner most lane among left side forward travelling lanes, and a second left turn travel path C4' and C5' for the vehicle to travel from the current travelling lane along a second left side forward travelling lane LL2, which is an outside lane among the left side forward travelling lanes may be generated.

That is, a 4-1 curve C4 forming the first left turn travel path connects the intersection point $P_{1C}$ to the intersection point $P2_{CC}$ is a curve having a radius of curvature corresponding to a straight line distance between the intersection points $P_{1C}$-$P_{2CC}$, and a 4-2 curve C5 forming the first left turn travel path connects the intersection point $P_{1CR}$ to the intersection point $P_{2CL}$ is a curve having a radius of curvature corresponding to a straight line distance between the intersection points $P_{1CR}$-$P_{2CL}$.

In addition, in a state shown in FIG. 6, when the turn signal is not activated, the travel path calculating unit 230 may generate a straightforward travel path including straight lines L1 and L2 connecting a left side intersection point $P_{1CR}$ and a right side intersection point $P_{1RR}$ of the travel lane to a left side intersection point $P_{3CL}$ and a right side intersection point $P_{3LL}$ of a forward travelling lane on the opposite side, respectively, to perform a straightforward travel.

FIG. 7 is a diagram illustrating a lane modeling for calculating a vehicle travel path according to the present embodiment.

The travel path calculating unit 230 may calculate a vehicle travel path in a lane on the basis of lateral offset information of the vehicle immediately before entering the intersection, heading angle information of the vehicle with respect to the lane, and a radius of curvature of the vehicle travel path at the intersection. To this end, the travel path calculating unit 230 may use a path generation model as shown in FIG. 7.

That is, after calculating the vehicle travel path through the intersection points as shown in FIGS. 4 to 6, a vehicle travel path in a lane (an in-lane vehicle travel path) may be additionally calculated for a precise position control of the vehicle in the corresponding lane or travel path. To this end, lateral offset information of the vehicle immediately before entering the intersection, heading angle information of the vehicle with respect to the lane, and a radius of curvature of the vehicle travel path at the intersection may be used.

In detail, referring to FIG. 7, a vehicle travel path may include an imaginary center line 710, a left lane 712, and a right lane 714.

In this state, a vehicle travel path in a lane Y may be determined on the basis of a current heading angle $C_{11}$ of the vehicle, a lateral offset value $C_{10}$ of the vehicle with respect to the lane, and a curvature $C_{21}$ of the lane, according to a lane model as shown in Equation 1 below.

$$Y = C_{01} + C_{1I}X + C_{2I}X^2 + C_{3I}X^3 \quad \text{[Equation 1]}$$

In Equation 1, $C_{01}$ denotes the amount of lateral offset of a center of a vehicle with respect to a lane, and represents the degree of lateral displacement of the center of the vehicle from one of a left line, an imaginary centerline, and a right line.

In addition, $C_{11}$ denotes a heading angle, that is, an angle between the vehicle travelling direction and the imaginary center line 710 or between the left and right lines 712 and 714, which are straight line sections, and the lane.

$C_{21}$ denotes the curvature of a curve section of the lane, and $C_{31}$ denotes a time variable (a differential value) of the curvature.

When the vehicle travel path in the lane is calculated by Equation 1, the vehicle travel control unit 300 included in the apparatus for controlling the vehicle according to the present embodiment controls the engine control unit, the steering control unit, and the braking control unit such that the vehicle autonomously travels along the vehicle travel path in the lane.

By using the above-described vehicle control apparatus and vehicle travel path calculating device, the exact positions of intersection points, which are crossing points of lanes at the intersection, and the vehicle travel path (straight, left turn, right turn) in the intersection may be precisely calculated. By automatically controlling the vehicle travel on the basis of the intersection points, safe autonomous driving at an intersection is provided.

Figure 8:
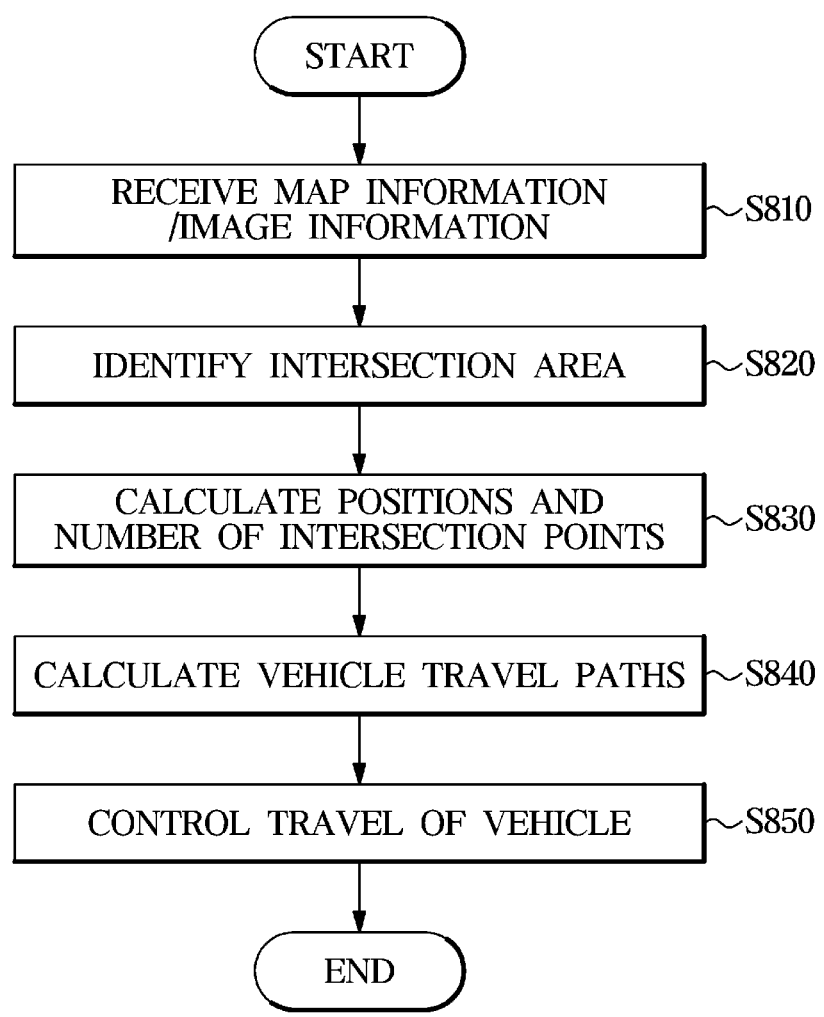
FIG. 8 is a flowchart showing the overall flow of a method of controlling a vehicle according to the present embodiment.

FIG. 8 is a flowchart showing the overall flow of a method of controlling a vehicle according to the present embodiment.

Referring to FIG. 8, the method of controlling a vehicle according to the present embodiment includes an information receiving operation for receiving map information and image sensor information (S810), an intersection identifying operation for identifying an intersection area on the basis of the map information and the image sensor information (S820), an intersection point information calculating operation for calculating the positions and the number of a plurality of intersection points on the basis of a lane continuing characteristic and a lane crossing characteristic in the intersection area (S830), a travel path calculating operation for calculating one or more vehicle travel paths in the intersection area on the basis of the positions and the number of the intersection points (S840), and a vehicle travel control operation for controlling a travel of the vehicle according to the calculated vehicle travel path (S850).

In the intersection point information calculating operation S830, the lane continuing characteristic includes information about a lane cut position in which a lane is cut by a predetermined length or more in the intersection area, the lane crossing characteristic includes information about a lane crossing position in which two lanes cross each other, and the intersection point information calculating unit may determine the lane cut position and the lane crossing position as the intersection point.

In addition, the method of controlling the vehicle according to the present embodiment may further include an intersection form determining operation for determining one of the number of available travel lanes at the intersection and the shape of the intersection on the basis of at least one of information about the number of lanes sensed in the intersection area and information about the type of a signal lamp.

In the travel path calculating operation S840, one of a straightforward travel path, a left turn travel path, and a right turn travel path may be generated using the information about intersection points calculated in the intersection point information calculating operation S830 and vehicle turn signal operation information.

In addition, in the travel path calculating operation S840, an in-lane vehicle travel path, which is a target movement path of a vehicle within a calculated vehicle travel path (a lane), may be further calculated, and the in-lane vehicle travel path may be determined on the basis of lateral offset information of the vehicle, heading angle information of the vehicle with respect to the lane, and a curvature of the vehicle travel path at the intersection, according to the lane model as shown in Equation 1.

In addition, since the specific configuration of calculating the intersection point information and calculating the vehicle travel path by the apparatus for controlling the vehicle according to the present embodiment is the same as that described above with respect to FIGS. 3 to 7, detailed description thereof will be omitted.

Although the apparatus and method for controlling the vehicle at the intersection have been described above, the vehicle path calculating device for identifying an intersection area and calculating intersection point information and a vehicle travel path based on the intersection point information will be construed as being included in the present disclosure.

That is, the vehicle path generating device 200 according to the present disclosure includes the intersection identifying unit 210 configured to identify an intersection area on the basis of at least one of received map information and image sensor information, the intersection point information calculating unit 220 configured to calculate the positions and the number of a plurality of intersection points on the basis of a lane continuing characteristic and a lane crossing characteristic in the intersection area, and the travel path calculating unit 230 configured to calculate one or more vehicle travel paths in the intersection area on the basis of the positions and the number of the intersection points.

The vehicle path generating device 200 does not need to be used only for a vehicle travel control system at an intersection, and may be used in association with all other systems and apparatuses in the field in which a precise vehicle path at an intersection needs to be generated, such as a driver assistance system (DAS) or a traffic control system.

As described above, when the vehicle controlling apparatus and the vehicle travel path calculating device according to the present embodiment are used, the precise position of an intersection point, that is, a cut position of a lane or a crossing point of lanes at an intersection, and a vehicle travel path (straightforward, left turn, right turn) within an intersection may be precisely calculated, and a travel of the vehicle may be automatically controlled on the basis of the calculated position of the intersection point and the vehicle travel path, thereby providing safe autonomous driving at the intersection.

As is apparent from the above, the embodiment of the present invention can enhance the precision of a vehicle movable path in an intersection area by calculating a precise position of an intersection point corresponding to a crossing point of lanes at an intersection and calculating a vehicle travel path on the basis of the calculated position of the intersection point.

In addition, the embodiment of the present invention can provide safe autonomous driving at an intersection by calculating the positions of a plurality of intersection points at an intersection, calculating a vehicle movement path through the calculated positions, and automatically controlling the travel of the vehicle on the basis of the vehicle movement path.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. An apparatus for controlling a vehicle, the apparatus comprising:
   an image sensor disposed on a vehicle to have a field of view of an exterior of the vehicle and configured to capture image data;
   a map storage configured to store map information of a surrounding of the vehicle; and
   a controller comprising a processor for processing the image data captured by the image sensor,
   wherein the controller is configured to:
   identify an intersection area based on at least part of the processing of the image data captured by the image sensor,
   determine intersection point information about a plurality of intersection points in the intersection area based on at least part of the processing of the image data captured by the image sensor,
   determine a vehicle travel path in the intersection area using the determined intersection point information and control travel of the vehicle based on the determined vehicle travel path,
   determine a virtual left curve and a virtual right curve, wherein the virtual left curve connects a left side intersection point of a travel lane of the vehicle to a left side intersection point of one lane of a left turn travel path, a straightforward travel path or a right turn travel path which is determined based on turn signal operation information of the vehicle, and the virtual right curve connects a right side intersection point of the travel lane to a right side intersection point of one lane of the left turn travel path, the straightforward travel path, or the right turn travel path which is determined based on turn signal operation information of the vehicle, and
   model the virtual left curve and the virtual right curve as a three-dimensional equation having lateral offset information of the vehicle immediately before entering the intersection, heading angle information of the vehicle with respect to the lane, and a curvature of the vehicle travel path at the intersection.

2. The apparatus of claim 1, wherein the controller is configured to:
   identify an intersection area based on at least one of the map information or image sensor information,
   determine positions and a number of a plurality of intersection points based on a lane continuing characteristic and a lane crossing characteristic in the intersection area, and
   determine the vehicle travel path in the intersection area based on the determined positions and the number of the intersection points.

3. The apparatus of claim 2, wherein the lane continuing characteristic comprises information about a lane cut position in which a lane is cut by a predetermined length or more in the intersection area, the lane crossing characteristic comprises information about a lane crossing position in which two lanes cross each other, and the controller is configured to determine the lane cut position and the lane crossing position to be the intersection points.

4. The apparatus of claim 3, wherein the controller is configured to determine a number of available travel lanes at the intersection and a shape of the intersection based on at least one of information about a number of lanes sensed in the intersection area and information about a type of a signal lamp.

5. The apparatus of claim 1, wherein the controller is configured to, among the intersection points:
   set positions of a 1-1 intersection point and a 1-2 intersection point corresponding to a left side intersection point and a right side intersection point of a travel lane on which the vehicle travels as a first reference position;
   set one of positions of a 2-1 intersection point and a 2-2 intersection point corresponding to a left side intersection point and a right side intersection point of a left side distant lane located on a left distant side of the travel lane relative to the vehicle, a position of a 3-1 intersection point corresponding to a left side intersection point of a right side near lane located on a right near side of the travel lane relative to the vehicle, and positions of a 4-1 intersection point and a 4-2 intersection point corresponding to a left side intersection point and a right side intersection point of an opposite lane of the travel lane as a second reference position; and
   generate vehicle travel path information passing through the first reference position and the second reference position.

6. The apparatus of claim 5, wherein the vehicle travel path information comprises left turn travel path information comprising a 1-1 curve having a predetermined first radius of curvature and passing through the 1-1 intersection point and the 2-1 intersection point and a 1-2 curve having a predetermined second radius of curvature and passing through the 1-2 intersection point and the 2-2 intersection point.

7. The apparatus of claim 6, wherein the first radius of curvature is a first distance between the 1-1 intersection point and the 2-1 intersection point, and the second radius of curvature is a second distance between the 1-2 intersection point and the 2-2 intersection point.

8. An apparatus for controlling a vehicle, the apparatus comprising:
   an image sensor disposed on a vehicle to have a field of view of an exterior of the vehicle and configured to capture image data;
   a non-image sensor disposed on the vehicle and configured to capture sensing data to sense one of objects around the vehicle;
   a vehicle dynamics sensor disposed on the vehicle and configured to sense information related to travel of a vehicle; and
   an integrated controller configured to process at least one of image data captured by the image sensor and sensing data captured by the non-image sensor,
   wherein the integrated controller is configured to, based on at least part of the processing of the image data captured by the image sensor (i) identify an intersection area, (ii) determine intersection point information comprising positions and a number of a plurality of intersection points based on a lane continuing characteristic and a lane crossing characteristic in the intersection area, (iii) determine one or more vehicle travel path in the intersection area using the determined intersection point information, and iv) control travel of the vehicle based on the determined vehicle travel path, wherein the integrated controller is further configured to:

determine a virtual left curve and a virtual right curve, wherein the virtual left curve connects a left side intersection point of a travel lane of the vehicle to a left side intersection point of one lane of a left turn travel path, a straightforward travel path or a right turn travel path which is determined based on turn signal operation information of the vehicle, and the virtual right curve connects a right side intersection point of the travel lane to a right side intersection point of one lane of the left turn travel path, the straightforward travel path, or the right turn travel path which is determined based on turn signal operation information of the vehicle, and models the virtual left curve and the virtual right curve as a three-dimensional equation having lateral offset information of the vehicle immediately before entering the intersection, heading angle information of the vehicle with respect to the lane, and a curvature of the vehicle travel path at the intersection.

9. An apparatus for calculating a path of a vehicle, the apparatus comprising:

an intersection identifying unit configured to identify an intersection area using at least part of image data from an image sensor disposed on a vehicle to have a field of view of an exterior of the vehicle and configured to capture image data;

an intersection point information calculating unit configured to calculate positions and a number of a plurality of intersection points, based on a lane continuing characteristic and a lane crossing characteristic in the intersection area; and a travel path calculating unit configured to calculate one or more vehicle travel paths in the intersection area based on the positions and the number of the intersection points, wherein the travel path calculating unit is configured to:

determine a virtual left curve and a virtual right curve, wherein the virtual left curve connects a left side intersection point of a travel lane of the vehicle to a left side intersection point of one of a left turn travel path, a straightforward travel path or a right turn travel path which is determined based on turn signal operation information of the vehicle, and the virtual right curve connects a right side intersection point of the travel lane to a right side intersection point of one of the left turn travel path, the straightforward travel path, or the right turn travel path which is determined based on turn signal operation information of the vehicle, and models the virtual left curve and the virtual right curve as a three-dimensional equation having lateral offset information of the vehicle immediately before entering the intersection, heading angle information of the vehicle with respect to the lane, and a curvature of the vehicle travel path at the intersection.

10. The apparatus of claim 9, wherein the lane continuing characteristic comprises information about a lane cut position in which a lane is cut by a predetermined length or more in the intersection area, the lane crossing characteristic comprises information about a lane crossing position in which two lanes cross each other, and the intersection point information calculating unit determines the lane cut position and the lane crossing position as the intersection points.

11. A method of controlling a vehicle, the method comprising:

identifying an intersection area based on at least one of map information and image data captured by an image sensor;

determining positions and a number of a plurality of intersection points based on a lane continuing characteristic and a lane crossing characteristic in the intersection area;

determining a vehicle travel path in the intersection area based on the positions and the number of the intersection points; and controlling travel of the vehicle based on the determined vehicle travel path, wherein the method further comprises:

determining a virtual left curve and a virtual right curve, wherein the virtual left curve connects a left side intersection point of a travel lane of the vehicle to a left side intersection point of one of a left turn travel path, a straightforward travel path or a right turn travel path which is determined based on turn signal operation information of the vehicle, and the virtual right curve connects a right side intersection point of the travel lane to a right side intersection point of one of the left turn travel path, the straightforward travel path, or the right turn travel path which is determined based on turn signal operation information of the vehicle, and modeling the virtual left curve and the virtual right curve as a three-dimensional equation having lateral offset information of the vehicle immediately before entering the intersection, heading angle information of the vehicle with respect to the lane, and a curvature of the vehicle travel path at the intersection.

12. The method of claim 11, wherein the lane continuing characteristic comprises information about a lane cut position in which a lane is cut by a predetermined length or more in the intersection area, the lane crossing characteristic comprises information about a lane crossing position in which two lanes cross each other, and the determining positions and a number of the plurality of intersection points comprises determining the lane cut position and the lane crossing position to be the intersection point.

13. The method of claim 12, further comprising determining a number of available travel lanes at the intersection and a shape of the intersection based on at least one of information about a number of lanes sensed in the intersection area and information about a type of a signal lamp.

14. The method of claim 13, wherein the determining the vehicle travel path in the intersection area comprises, among the intersection points:

setting positions of a 1-1 intersection point and a 1-2 intersection point corresponding to a left side intersection point and a right side intersection point of a travel lane on which the vehicle travels as a first reference position;

setting one of positions of a 2-1 intersection point and a 2-2 intersection point corresponding to a left side intersection point and a right side intersection point of a left side distant lane located on a left distant side of the travel lane relative to the vehicle, a position of a 3-1 intersection point corresponding to a left side intersection point of a right side near lane located on a right near side of the travel lane relative to the vehicle, and positions of a 4-1 intersection point and a 4-2 intersection point corresponding to a left side intersection point and a right side intersection point of an opposite lane of the travel lane as a second reference position; and generating vehicle travel path information passing through the first reference position and the second reference position.

15. The method of claim 14, wherein the vehicle travel path information comprises left turn travel path information comprising a 1-1 curve having a predetermined first radius of curvature and passing through the 1-1 intersection point and the 2-1 intersection point and a 1-2 curve having a predetermined second radius of curvature and passing through the 1-2 intersection point and the 2-2 intersection point.

16. The method of claim 15, wherein the first radius of curvature is a first distance between the 1-1 intersection point and the 2-1 intersection point, and the second radius of curvature is a second distance between the 1-2 intersection point and the 2-2 intersection point.

* * * * *